Dec. 10, 1935.   J. J. NEUMAN   2,023,611
PULLEY OR IDLER
Filed June 18, 1935
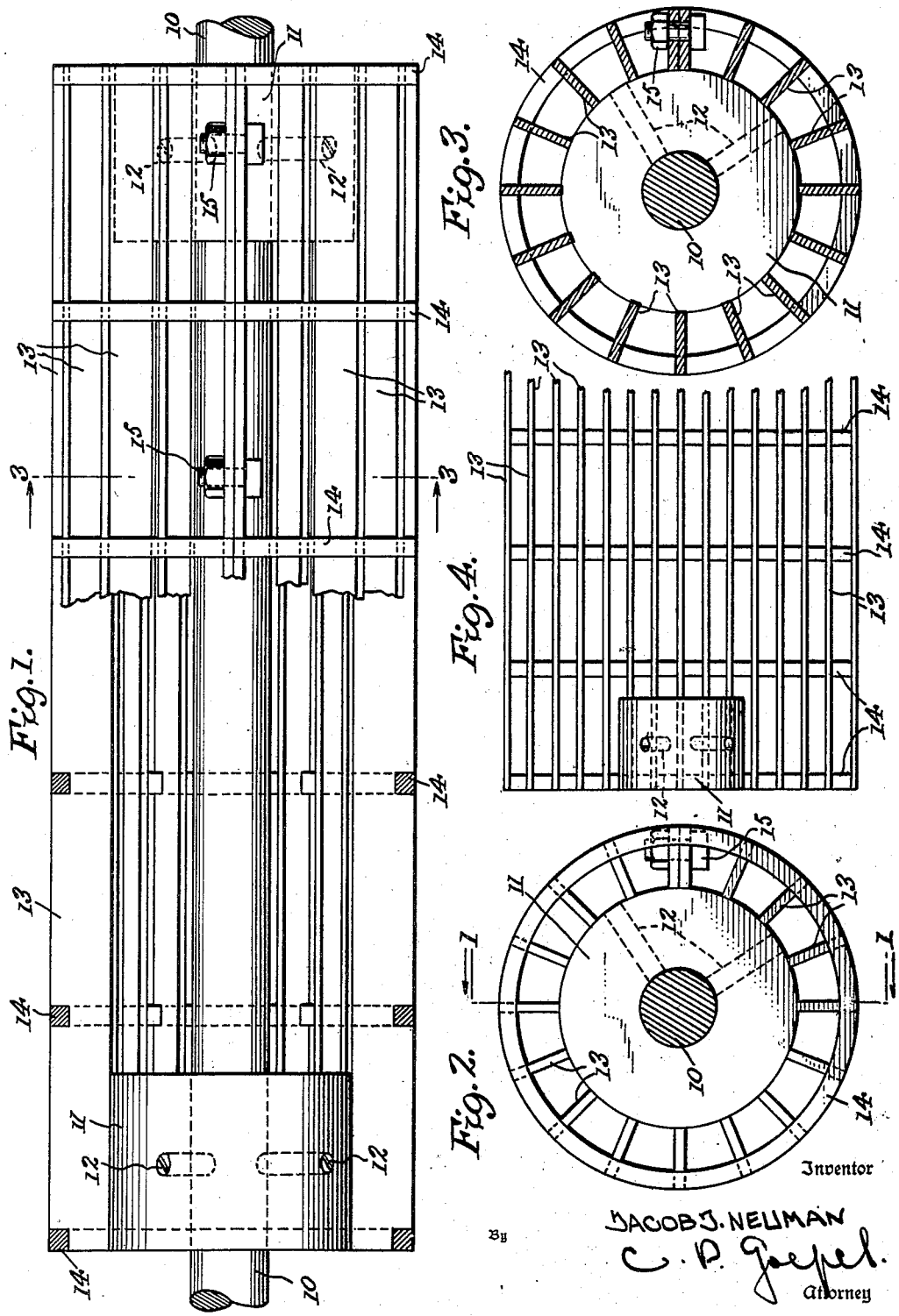
Inventor
JACOB J. NEUMAN
By C. P. Goepel
Attorney Patented Dec. 10, 1935

2,023,611

UNITED STATES PATENT OFFICE 2,023,611

PULLEY OR IDLER

Jacob J. Neuman, South Salem, N. Y.

Application June 18, 1935, Serial No. 27,146

5 Claims. (Cl. 74—230.5)

This invention relates to pulleys or idlers which may be used on belt conveyers of various types and particularly as used in the sugar industry.

A difficulty to be overcome is that where the sugar is sticky or wet, the sugar will stick to the pulleys of the conveyers and build up and cause the conveyer belt to run off its normal course, and is liable to destroy the belt. Where ordinary pulleys are used on the conveyer considerable labor must be expended to clean these pulleys.

While the squirrel cage or open pulley is not new as a type of pulley, those heretofore known and used are not satisfactory from the points of use, construction, and cost of manufacture.

In pulleys of this character heretofore manufactured it has been necessary to make up bulky end castings which are extremely costly to machine and assemble, and then each individual strap has to be bolted on; thus limiting the number of cross straps possible due to construction difficulties.

It is therefore an object of this invention to provide a squirrel cage or slatted pulley which will accomplish the purpose of pulleys of this character and which is cheap and easy to manufacture and which as a product is strong and durable and which does not easily become clogged with sticky or other materials with which the conveyers are used.

Another object of the invention is to provide a pulley which may be of the same construction for the head and tail pulleys of a conveyer and for idlers wherever needed.

A further object is to provide a pulley having spaced apart bushings or hub members about which is rolled a metal grating, the bars of the grating providing slats for the pulley to extend across and between the bushings and the straps of the grating, which are welded across the bars, providing annular clamping rings to hold the bars on the bushings.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a side elevation, partly in section on the line 1—1 of Figure 2, of a pulley embodying the features of the present invention.

Figure 2 is an end elevation of the pulley.

Figure 3 is a transverse section on the line 3—3 of Figure 1, showing the clamping means for the peripheral grating, and Figure 4 is a fragmentary plan view of one end of the grating with an adjacent bushing and ready for rolling about the bushing to make the pulley.

Referring now to the drawing, 10 designates a shaft to which the pulley may be applied.

The pulley or idler has a desired number of bushings 11 providing hub members adapted to be mounted on the shaft 10, and which may be secured to the shaft by countersunk set screws 12. In the present illustration two bushings 11 are shown and these are spaced apart substantially the width of the pulley and held in their relative positions on the shaft 10 by the set screws 12. The bushings 11 may be of any suitable material and may be, as shown, in the form of solid cylindrical blocks axially apertured for receiving the shaft 10 therethrough and radially apertured to receive the set screws 12, although other suitable and economical constructions may be resorted to.

The peripheral portion or wall of the pulley comprises a grating rolled into cylindrical form about the bushings 11 and may be of suitable width depending upon the width of the pulley desired.

As shown in Figure 4, particularly, the grating comprises a plurality of flat metal bars 13 disposed in edgewise and parallel relation across spaced metal straps 14, and the bars and straps are welded or otherwise economically secured together at their crossed portions.

The straps 14 are of less depth than the bars 13 and are rabbeted or seated in the adjacent crossed edges of the bars 13 at one side of the grating leaving the opposite edges of the bars 13 uninterrupted and outstanding from the straps 14. The bars 13 are of a length equal to the width of the completed pulley, whereas the straps 14 are of a length equal to the perimeter of finished pulley and with a bar 13 disposed across the ends of the straps 14 at each end of the grating. The end bars 13 are adapted to be clamped together, or substantially so, when the grating is rolled into shape as shown to advantage in Figures 2 and 3. The grating, as shown in Figure 4, is in flat form with the crossed portion of the bars 13 and straps 14 welded together so that no further bolts or fastening means are necessary to hold the bars to the straps.

In manufacturing the pulley, the bushings 11 may be placed one at each edge of the grating as shown in Figure 4, and with the free edges of the bars 13 against the peripheral surfaces of the bushings. The grating is now rolled upon the bushings 11 and the end bars 13 are brought together as shown in Figures 2 and 3. Clamping bolts 15 are secured through the adjacent end bars 13 and are drawn up tight to bind the bars 13 in edgewise relation on the bushings 11 and clamp the grating in place. The straps 14 are bent into the form of rings which transmit the pressure to the bars 13, and the latter provide slats for the pulley surface.

From Figures 2 and 3, particularly, it will be observed that the straps or rings 14 are countersunk in the outer edges of the bars or slats 13 and thus the exterior surface or peripheral portion of the pulley is left free and uninterrupted to receive a conveyer belt or the like thereover. This construction of pulley may be used at the head or tail of a conveyer, or has an intermediate idler pulley, and the set screws 12 are so positioned in the bushings or hub members 11 that they register with spaces between the bars or slats 13. The grating is thus positioned on the bushings with reference to the set screws so that access may be readily had thereto for clamping and releasing the pulley with respect to the shaft 10.

The pulley thus constructed is of extreme simplicity, requiring but a few clamping bolts 15 as the peripheral portion of the pulley is constructed of a pre-formed grating the bars and straps of which may be welded together so that the building up of the pulley may be accomplished quickly, easily and economically as the bars or slats 13 are maintained equi-distantly spaced apart and are all brought into their respective positions in the pulley structure by the wrapping of the grating around the bushings 11.

The straps 14 are of bendable material, such as soft iron or the like, while the bars 13 may be of relatively stiff material incident to increased thickness or to inherently stiff material. The straps 14 are adapted to bend as the grating is rolled about the hub members.

What is claimed is:—

1. A pulley, comprising a pair of spaced apart hub members, a unitary and initially flat grating of spaced bars and cross straps secured thereto, said grating adapted to be curved about the hub members with the edges of the bars bearing against the peripheral surfaces of the hub members, and clamping means for drawing the ends of the grating together to bind the grating in position.

2. A pulley, comprising a pair of spaced apart hub members having exterior cylindrical surfaces, an initially flat grating rolled around the hub members and having spaced bars engaging at their inner edges against the cylindrical surfaces of the hub members to provide spaced slats for the peripheral face of the pulley and also having cross straps welded to the bars to hold the same in their relative position, said grating having a bar at each end and the end bars being disposed in substantially abutting relation at the side of the pulley, and clamping means engaging the end bars for drawing the same together and binding the grating on the bushings.

3. A pulley, comprising an initially flat metallic grating adapted to be rolled into cylindrical form and composed of spaced apart stiff bars with bendable straps countersunk in and welded across the outer edges of the bars at one side of the grating, a pair of stiff hub members disposed in the opposite ends of the rolled grating for holding the grating in rolled form, and clamping means for the grating to bind the same about the hub members with the inner edges of the grating bars bearing against the hub members.

4. A pulley, comprising an initially flat metallic grating adapted to be rolled into cylindrical form and composed of radially edgewise disposed spaced apart bars having bendable straps secured across the bars to hold the latter in their relative positions, hub members disposed within the cylindrically rolled grating, and clamping means for the grating for binding the inner edges of the bars against the hub members.

5. A pulley, comprising hub members adapted to be mounted on a shaft, set screws radially disposed in countersunk relation in the hub members for fixing the same upon the shaft and in spaced apart relation, and a bendable grating rolled about the hub members, said grating having spaced edgewise disposed bars having their inner edges in contact with the hub members and the grating also having straps connected across the bars for holding the same in spaced apart and radially disposed positions on the hub members, the grating being disposed upon the hub members with the bars of the grating being radially disposed and circumferentially offset with respect to said set screws of the hub members to admit access thereto through the grating, and clamping means engaging the ends of the grating for drawing the same taut about the hub members to bind said bars thereon, said bars providing spaced slats in the peripheral surface of the pulley.

JACOB J. NEUMAN.